United States Patent [19]

Pyzik et al.

[11] Patent Number: 5,118,645

[45] Date of Patent: * Jun. 2, 1992

[54] SELF-REINFORCED SILICON NITRIDE CERAMIC OF HIGH FRACTURE TOUGHNESS AND A METHOD OF PREPARING THE SAME

[75] Inventors: Aleksander J. Pyzik; Harold E. Rossow; Douglas B. Schwarz; Donald R. Beaman; Barbara M. Pyzik, all of Midland; William J. Dubensky, Traverse City, all of Mich.

[73] Assignee: The Dow Chemical Company, Midland, Mich.

[*] Notice: The portion of the term of this patent subsequent to Nov. 28, 2006 has been disclaimed.

[21] Appl. No.: 572,823

[22] Filed: Aug. 24, 1990

Related U.S. Application Data

[63] Continuation-in-part of Ser. No. 398,801, Aug. 25, 1989, Pat. No. 5,021,372, which is a continuation-in-part of Ser. No. 297,627, Jan. 13, 1989, abandoned, which is a continuation-in-part of Ser. No. 148,748, Jan. 27, 1988, Pat. No. 4,883,776.

[51] Int. Cl.⁵ ............................................. C04B 35/58
[52] U.S. Cl. ........................................ 501/97; 501/98; 501/95; 264/65
[58] Field of Search ................. 501/97, 98, 95; 264/65

[56] References Cited

U.S. PATENT DOCUMENTS

| | | | |
|---|---|---|---|
| 3,950,464 | 3/1976 | Masaki | 264/65 |
| 4,004,937 | 2/1977 | Masaki | 106/59 |
| 4,025,351 | 1/1977 | Masaki | 106/59 |
| 4,046,580 | 2/1977 | Ishii et al. | 106/55 |
| 4,097,293 | 9/1978 | Komeya et al. | 106/43 |
| 4,119,689 | 10/1978 | Prochazka et al. | 264/65 |
| 4,179,301 | 4/1979 | Buljan | 106/73.5 |
| 4,218,257 | 11/1980 | Oda | 106/73.5 |
| 4,227,842 | 9/1980 | Samanta et al. | 409/131 |
| 4,279,657 | 11/1981 | Greskovich | 106/73.5 |
| 4,296,065 | 7/1981 | Ishii et al. | 264/325 |
| 4,323,325 | 9/1982 | Samanta et al. | 409/131 |
| 4,406,668 | 4/1983 | Sarin et al. | 51/295 |
| 4,407,970 | 5/1983 | Komatsu et al. | 501/97 |
| 4,511,525 | 6/1985 | Tsuge et al. | 264/65 |
| 4,543,345 | 8/1985 | Wei | 501/95 |
| 4,603,116 | 8/1986 | Smith et al. | 501/97 |
| 4,609,633 | 6/1986 | Fukuhara | 501/97 |
| 4,652,276 | 1/1987 | Burden | 51/308 |
| 4,699,890 | 4/1987 | Matsui | 501/98 |
| 4,717,693 | 1/1988 | Wittmer | 501/97 |
| 4,734,234 | 4/1988 | Sterzel | 264/66 |
| 4,753,764 | 2/1988 | Kamijo et al. | 264/63 |
| 4,879,263 | 11/1989 | Kemeya et al. | 501/127 X |
| 4,883,776 | 9/1989 | Pyzik et al. | 501/10 |
| 4,919,689 | 2/1990 | Pyzik et al. | 51/309 |
| 4,923,829 | 3/1990 | Yasutomi | 501/95 |

FOREIGN PATENT DOCUMENTS

| | | |
|---|---|---|
| 079678 | 1/1983 | European Pat. Off. |
| 100380 | 5/1984 | European Pat. Off. |
| 228022 | 4/1987 | European Pat. Off. |
| 58064274 | 4/1983 | Japan |
| 59021413 | 6/1984 | Japan |
| 6178657 | 2/1986 | Japan |
| 61106430 | 11/1986 | Japan |

OTHER PUBLICATIONS

Akihiko Tsuge et al., Journal of The American Ceramics Society, 58 323-326 (1975).
F. F. Lange, Journal of The American Ceramics Society 62, 1369-1374 (1983).
Chemical Abstract 105:157787w (1986).

Primary Examiner—Karl Group
Attorney, Agent, or Firm—D. R. Howard

[57] ABSTRACT

A process for preparing a self-reinforced silicon nitride ceramic body of high fracture toughness comprising hot-pressing a powder mixture containing silicon nitride, a densification aid such as sodium oxide, a conversion aid such as lanthanum oxide and a compound, such as gallium oxide, which enhances growth of $\beta$-silicon nitride whiskers-under conditions such that densification and the in situ formation of $\beta$-silicon nitride whiskers having a high aspect ratio occur. A novel silicon nitride ceramic of high fracture toughness and high fracture strength is disclosed comprising a $\beta$-silicon nitride crystalline phase wherein at least about 20 volume percent of the phase is in the form of whiskers having an average aspect ratio of at least about 2.5; a glassy second phase containing the densification aid, the conversion aid, the compound which enhances growth of $\beta$-silicon nitride whiskers, and an amount of silica; and not greater than about 10 weight percent of the total weight as other phases. The glassy phase may also include a minor amount, e.g., up to 5.0 weight percentg, based upon total weight of the ceramic, of aluminum nitride or boron nitride. The glassy phase optionally includes an amount of a secondary reinforcing material such as silicon carbide whiskers.

21 Claims, No Drawings

SELF-REINFORCED SILICON NITRIDE CERAMIC OF HIGH FRACTURE TOUGHNESS AND A METHOD OF PREPARING THE SAME

CROSS-REFERENCE TO RELATED APPLICATION

This application is a Continuation-in-Part of copending application Ser. No. 07/398,801, filed Aug. 25, 1989, now U.S. Pat. No. 5,021,372, which is a Continuation-in-Part of application Ser. No. 07/297,627, filed Jan. 13, 1989, now abandoned, which is a Continuation-in-Part of application Ser. No. 07/148,748, filed Jan. 27, 1988, now U.S. Pat. No. 4,883,776.

BACKGROUND OF THE INVENTION

This invention pertains to a silicon nitride ($Si_3N_4$) ceramic body and a process for preparing the ceramic body.

Silicon nitride ceramics are recognized for their excellent mechanical and physical properties, including good wear resistance, low coefficient of thermal expansion, good thermal shock resistance, high creep resistance and high electrical resistivity. In addition, silicon nitride ceramics are resistant to chemical attack, particularly to oxidation. Because of these attributes, silicon nitride is useful in a variety of wear and high temperature applications, such as cutting tools and parts in pumps and engines.

Failure of silicon nitride ceramics is generally associated with brittleness and flaws. The object therefore is to prepare a silicon nitride ceramic with high fracture toughness ($K_{IC}$) and strength. Fracture strength is directly proportional to the fracture toughness and inversely proportional to the square root of the flaw size. High fracture toughness combined with small flaw size is therefore highly desirable. Monolithic silicon nitride, however, has a relatively low fracture toughness of about 5 MPa $(m)^{\frac{1}{2}}$.

It would be very desirable to have a silicon nitride ceramic of high fracture toughness and high fracture strength. Moreover, it would be highly desirable to have a process which would be reproducible, inexpensive, and amenable to industrial scale-up for preparing such a tough and strong silicon nitride ceramic.

SUMMARY OF THE INVENTION

In a first aspect of this invention is a process for preparing a self-reinforced silicon nitride ceramic body containing predominately $\beta$-silicon nitride whiskers having a high average aspect ratio. The process comprises subjecting a powder mixture comprising:

(a) silicon nitride in an amount sufficient to provide a ceramic body;
(b) a densification aid, said densification aid being a non-oxide derivative of magnesium or a source of an element selected from the group consisting of beryllium, calcium, strontium, barium, radium, lithium, sodium, potassium, rubidium, cesium, silicon, hafnium, tantalum, indium, galium, zinc, titanium and francium, said source being present in an amount sufficient to promote densification of the powder;
(c) a conversion aid, said conversion aid being a non-oxide derivative of yttrium or a source of an element selected from the group consisting of scandium, actinium, lanthanum, lithium, sodium, potassium, rubidium, cesium and francium, said source being present in an amount sufficient to promote the essentially complete conversion of the starting silicon nitride to $\beta$-silicon nitride; and
(d) at least one whisker growth enhancing compound in an amount sufficient to promote the formation of $\beta$-silicon nitride whiskers, said compound being a non-oxide derivative of calcium, or a derivative of an element selected from the group consisting of sodium, potassium, scandium, titanium, vanadium, chromium, manganese, iron, cobalt, nickel, copper, zinc, strontium, zirconium, niobium, barium and lanthanum, and mixtures thereof, or an oxide of an element selected from the group consisting of gallium, indium, hafnium, tantalum and boron; (b), (c) and (d) being derived from three different elements;

to conditions of temperature and pressure sufficient to provide for densification and in situ formation of $\beta$-silicon nitride whiskers having a high average aspect ratio occur. In this manner a self-reinforced silicon nitride ceramic body having a fracture toughness greater than about 6 MPa $(m)^{\frac{1}{2}}$, as measured by the Chevron notch technique described hereinbelow, is formed. For the purposes of the present invention a "high" average aspect ratio means an average aspect ratio of at least about 2.5. The powder mixture optionally includes aluminum nitride or boron nitride in an amount of from about 0.01 to about five weight percent, based upon total powder mixture weight. Any means may be used to apply pressure and temperature so long as sufficient densification and in situ whisker formation occur. Application of pressure and temperature beneficially occurs by hot-pressing or hot isostatic pressing, preferably by hot-pressing.

In a related aspect, the powder mixture further comprises a Palmqvist toughness enhancing amount of at least one preformed reinforcing material. The material is selected from the group consisting of silicon carbide, titanium carbide, boron carbide, titanium diboride, aluminum oxide and zirconium oxide. The materials are in forms selected from the group consisting of whiskers, fibers, particles and platelets.

In a second aspect, this invention is a silicon nitride ceramic body having a fracture toughness greater than about 6 MPa $(m)^{\frac{1}{2}}$, as measured by the Chevron notch technique described hereinbelow, comprising:

(a) a crystalline phase of $\beta$-silicon nitride of which at least about 20 volume percent, as measured by viewing one plane of the silicon nitride ceramic body by scanning electron microscopy, is in the form of whiskers having an average aspect ratio of at least about 2.5; and
(b) a glassy phase, in an amount not greater than about 35 weight percent of the total weight, comprising a densification aid, e.g., a non-oxide derivative of magnesium, a conversion aid, e.g., a non-oxide derivative of yttrium, silica, and a beta-silicon nitride whisker growth enhancing compound, said compound being a non-oxide derivative of calcium, a derivative of an element selected from the group consisting of sodium, potassium, scandium, titanium, vanadium, chromium, manganese, iron, cobalt, nickel, copper, zinc, strontium, zirconium, niobium, barium and lanthanum, or an oxide of an element selected from the group consisting of gallium, indium, hafnium, tantalum and boron. The glassy phase optionally contains an amount, e.g., up to about 15.0 percent by weight of the glassy phase, of aluminum nitride or boron nitride. The densification aid and the conversion aid are the same as those detailed above in the first aspect. As in the first aspect, the densification aid, the conversion aid and the whisker growth enhancing compound are each based upon, or derived from, a different element.

In a related aspect, the glassy phase further comprises a Palmqvist toughness enhancing amount of at least one preformed reinforcing material. The material is selected from the group consisting of $\beta$-silicon nitride fibers or whiskers or silicon carbide, titanium carbide, boron carbide, titanium diboride, aluminum oxide or zirconium oxide in at least one form selected from the group consisting of whiskers, fibers, particles and platelets.

In a third aspect, this invention is a cutting tool comprising the above-identified silicon nitride ceramic body.

Unexpectedly, the silicon nitride ceramic body of this invention exhibits a significantly higher fracture toughness than the monolithic or whisker-reinforced silicon nitride ceramics of the prior art. Moreover, if the fracture toughness of the silicon nitride ceramic of this invention is normalized with respect to density, the normalized fracture toughness and fracture strength are among the highest known for any ceramic material. Advantageously, the silicon nitride ceramic of this invention is self-reinforced. More advantageously, the process for preparing the novel, self-reinforced silicon nitride ceramic body of this invention is reproducible, amenable to industrial scale-up, and less expensive than processes using silicon carbide whisker reinforcement.

DETAILED DESCRIPTION OF THE INVENTION

The silicon nitride starting material used in preparing ceramic body of this invention can be any silicon nitride powder, including the crystalline forms of $\alpha$-silicon nitride and $\beta$-silicon nitride, or noncrystalline amorphous silicon nitride, or mixtures thereof. Preferably, the silicon nitride powder is predominately in the alpha crystalline form or the amorphous form, or mixtures thereof. More preferably, the starting silicon nitride is predominately in the alpha crystalline form. It is also advantageous if the preferred starting powder possesses a high $\alpha/\beta$ weight ratio. Preferably, the starting powder contains no greater than about 20 weight percent $\beta$-silicon nitride; more preferably, no greater than about 10 weight percent $\beta$-silicon nitride; most preferably, no greater than about 6 weight percent $\beta$-silicon nitride.

Generally, the higher the purity of the starting silicon nitride powder, the better will be the properties of the finished ceramic body. Depending on the source, however, the silicon nitride powder may contain nonmetallic impurities. Some impurities may be tolerated in the powder, although it is preferred to minimize these as much as possible. Oxygen, for example, is present to some extent in the form of silica, $SiO_2$, which usually is found as a coating on the surface of the silicon nitride particles. The amount of silica varies according to the purity of the starting silicon nitride powder and its method of manufacture. The silica content may be reduced by leaching or increased by adding free silica in order to attain a desired total silica content. In addition to oxygen, elemental silicon is usually present in amounts ranging up to about 0.5 weight percent. These amounts of elemental silicon are not deleterious and can be tolerated. Other nonmetals, such as carbon which is likely to form silicon carbide during hot-pressing or sintering, are tolerable in small amounts.

The silicon nitride starting powder can be of any size or surface area provided that the ceramic body of this invention is obtained by hot-pressing. Large particles having an average diameter in the range from about 15 $\mu$m to about 50 $\mu$m, for example, may be in the form of hard agglomerates which cannot be easily broken. Powders containing such agglomerates make poor ceramics. On the other hand, very fine powders having an average diameter less than about 0.2 $\mu$m are difficult to obtain uniformly and to process. Preferably, the particles have an average diameter in the range from about 0.2 $\mu$m to about 10.0 $\mu$m; more preferably, from about 0.5 $\mu$m to about 3.0 $\mu$m. Preferably, the surface area of the silicon nitride particles is in the range from about 5 $m^2/g$ to about 15 $m^2/g$, as determined by the Brunauer-Emmett-Teller (BET) method of measuring surface area, which is described by C. N. Satterfield in *Heterogeneous Catalysis in Practice*, McGraw-Hill Book Company, 1980, pp. 102-105. More preferably, the surface area is in the range from about 8 $m^2/g$ to about 15 $m^2/g$.

The silicon nitride is present in an amount which is suitably in a range of from about 65 to about 99.75 weight percent based on total powder mixture weight. The range is desirably from about 80 to about 97 weight percent based upon total powder mixture weight. When a reinforcing material is present, the amount of silicon nitride is reduced so that a total of silicon nitride plus reinforcing material falls within these ranges.

Raw silicon nitride powders cannot be densified to high densities in the absence of densification aids. Thus, at least one densification aid is admixed with the silicon nitride starting powder in a manner described hereinbelow for the purpose of promoting densification of the silicon nitride during processing. The densification aids form a liquid phase into which the $\alpha$-silicon nitride dissolves. The liquid phase forms at a temperature or over a temperature range which varies with the densification aid. The rate of mass transport of the $\alpha$-silicon nitride is usually quite rapid in the liquid phase; thus, the silicon nitride density increases until a critical mass is reached and precipitation occurs.

U.S. Pat. No. 4,883,776 teaches the use of magnesium oxide as a densification aid. Copending application, Ser. No. 07/398,801, filed Aug. 25, 1989, expands the scope of densification aids to include non-oxide derivatives of magnesium. Non-oxide derivatives of magnesium include magnesium boride, magnesium nitride, and magnesium disilicide. The latter application also demonstrates that sources of beryllium, calcium, strontium, barium, radium, lithium, sodium, potassium, rubidium, cesium and francium also promote densification of silicon nitride. The source is suitably an oxide, but acceptable results are obtained with non-oxide derivatives such as borides or nitrides.

Any amount of a densification aid which promotes densification as described herein and produces the tough silicon nitride ceramic body of the invention is acceptable. The densification aid is beneficially a non-oxide derivative of magnesium, beryllium oxide, calcium oxide, strontium oxide, barium oxide or radium oxide. The densification aid is desirably calcium oxide or strontium oxide and is present in an amount in the range from about 0.04 weight percent to about 27.0 weight percent based on the total weight of the powder mixture. The amount of densification aid is desirably in the range from about 0.5 weight percent to about 9.8 weight percent: and preferably, from about 0.9 weight percent to about 4.7 weight percent.

In addition to a densification aid, the powder mixture must contain a conversion aid. The conversion aid forms a glassy phase through which mass transport is, in general, considerably slower than in the densification aid. Thus, α-silicon nitride dissolves in the conversion aid on heating, but is not readily densified. Advantageously, however, the conversion aid promotes the rapid, essentially complete conversion of α-silicon nitride to β-silicon nitride. This conversion is most desirable because the β-silicon nitride in the form of elongated, single crystal whiskers or grains is responsible for the high fracture toughness and high fracture strength of the silicon nitride ceramic body of this invention. All references hereinafter to silicon nitride whiskers, single crystal whiskers and single crystal silicon nitride whiskers are intended to be synonomous and may be used interchangeably. Any amount of conversion aid can be employed in the starting powder providing the quantity is sufficient to cause the essentially complete conversion of the starting silicon nitride to β-silicon nitride, and is sufficient to produce the tough silicon nitride ceramic body of the invention. Preferably, the amount of conversion aid employed is in the range from about 0.2 weight percent to about 29.5 weight percent based on the total weight of the powder mixture. More preferably, the amount of conversion aid employed is in the range from about 1.0 weight percent to about 10.0 weight percent; most preferably, from about 1.7 weight percent to about 8.5 weight percent.

The conversion aid is suitably a non-oxide derivative of yttrium or a source or derivative of an element selected from the group consisting of scandium, actinium, lanthanum, lithium, sodium, potassium, rubidium, cesium and francium. Non-oxide derivatives of yttrium include yttrium carbide. The conversion aid is beneficially scandium oxide, lanthanum oxide, actinium oxide or sodium oxide. The conversion aid preferably is lanthanum oxide or sodium oxide.

Surprisingly, the weight ratio of conversion aid to densification aid has been found to affect the fracture toughness of the finished ceramic, providing the whisker growth enhancing compound is also present in the powder mixture. Any weight ratio of conversion aid to densification aid is acceptable providing the fracture toughness shows an improvement over the fracture toughness value of 5 MPa (m)$^{\frac{1}{2}}$ for nonreinforced, monolithic silicon nitride. The weight ratio is suitably from about 0.25 to about 8. The weight ratio is beneficially in the range from about 0.5 to about 5; desirably, from about 1 to about 3; and, preferably, from about 1 to about 1.8. In the absence of a whisker growth enhancing compound, the conversion aid/densification aid weight ratio has no significant effect on the fracture toughness.

The third component required to be present in the powder mixture is a whisker growth enhancing compound. This compound helps to provide a ceramic body of superior fracture toughness and high strength. Just how the whisker growth enhancing compound contributes to the excellent physical properties which are observed in the silicon nitride ceramic body of this invention is not completely understood. It is possible that the whisker growth enhancing compound improves the viscosity of the glassy phase thereby facilitating the nucleation of elongated whiskers or grains of β-silicon nitride; the latter being primarily responsible for the improved fracture toughness. The aforementioned theory is presented with the understanding that such a theory is not to be binding or limiting of the scope of the invention. Any amount of the compound in the starting powder is acceptable providing the amount is sufficient to promote the formation of β-silicon nitride whiskers, described hereinbelow, and sufficient to produce the tough silicon nitride ceramic body of this invention. Preferably, the amount of the compound employed is in the range from about 0.01 weight percent to about five weight percent based on the total weight of the powder mixture. More preferably, the amount of whisker growth enhancing compound employed is in the range from about 0.1 weight percent to about 1.0 weight percent; most preferably, from about 0.2 weight percent to about 0.5 weight percent.

In U.S. Pat. No. 4,883,776, the presence of calcium, particularly calcium oxide, was found to provide advantages when silicon nitride powder compositions were formed by hot-pressing into finished ceramic bodies. Silicon nitride powders doped with up to about 5.3 weight percent calcium oxide were found to be desirable. It was believed that commercial silicon nitride powders contained only 100 ppm or less of calcium oxide.

An earlier application in this chain of applications, Ser. No. 07/297,627, filed Jan. 13, 1989 and now abandoned, included three discoveries. First, non-oxide derivatives of magnesium worked as densification aids. Second, non-oxide derivatives of yttrium provided satisfactory results when used as conversion aids. Third, elements of The Periodic Table of the Elements other than calcium also promoted growth of β-silicon nitride whiskers and provided hot-pressed silicon nitride ceramic bodies with a fracture toughness greater than about 6 MPa (m)$^{\frac{1}{2}}$, as measured by the Chevron notch technique and a fracture strength in excess of 120 ksi (825 MPa). Satisfactory results were obtained when the element was selected from the group consisting of sodium, potassium, scandium, titanium, vanadium, chromium, manganese, iron, cobalt, nickel, copper, zinc, strontium, zirconium, niobium, barium, lanthanum and mixtures thereof. The elements were beneficially selected from the group consisting of barium, sodium, potassium, titanium, vanadium, strontium, zirconium, niobium, lanthanum, tungsten and mixtures thereof. Desirable results followed when the element was titanium, niobium, strontium or a mixture of two or more of such elements. The foregoing elements, or mixtures thereof, were suitably added in the form of a derivative, e.g., an oxide, a boride, a carbide, a carbonitride, a nitride or an oxynitride, rather than in their elemental form.

Copending application, Ser. No. 07/398,801, filed Aug. 25, 1989, included the discovery that additional substitutions may be made for calcium oxide without sacrificing either fracture toughness or fracture strength. Particularly suitable results are obtained with an oxide of an element selected from the group consisting of gallium, indium, hafnium, tantalum and boron.

Acceptable results are believed to be attainable with derivatives of lithium, beryllium, magnesium, silicon, germanium, selenium, rubidium, molybdenum, technetium, ruthenium, rhodium, palladium, silver, cadmium, tin, antimony, tellurium, cesium, cerium, praseodymium, neodymium, promethium, samarium, europium, gadolinium, terbium, dysprosium, holmium, erbium, thulium, ytterbium, lutetium, tungsten, rhenium, osmium, iridium, platinum, gold, thallium, lead, bismuth, polonium, francium, radium, thorium, protactinium, neptunium, americium, curium, berkelium, californium, einsteinium, fermium, mendelevium, nobelium, and lawrencium. Non-oxide derivatives of gallium, indium, hafnium, tantalum and boron may also produce satisfactory results. Skilled artisans recognize that elements 58–71 and 90–103 of the Periodic Table of the Elements, commonly referred to as "the Lanthanides", are not readily available in their pure form. They are, however, available as mixtures of two or more of such elements. Such mixtures are also believed to be suitable for purposes of the present invention. Skilled artisans also recognize that certain of the elements and their derivatives may be less desirable than the others based upon considerations such as availability and cost.

Suitable results are also obtained with non-oxide derivatives of calcium. Illustrative non-oxide derivatives include calcium boride, calcium carbide, calcium nitride and calcium disilicide.

Skilled artisans will recognize that results will vary depending upon both the element(s) of choice and the particular derivative(s) of that element or mixture of elements. The whisker growth enhancing aid is beneficially a source or derivative of niobium or an oxide of an element selected from the group consisting of potassium, sodium, strontium, barium, scandium, lanthanum, titanium, zirconium, vanadium, chromium, tungsten, manganese, iron, cobalt, nickel, copper, zinc, calcium, gallium, indium, hafnium, tantalum and boron. The whisker growth enhancing aid is desirably niobium stannate, niobium galliate, niobium boride, or an oxide of potassium, barium, scandium, niobium, titanium, chromium, tungsten, manganese, cobalt, nickel, zinc, calcium, gallium, indium, hafnium, tantalum. The whisker growth enhancing aid is preferably an oxide of an element selected from the group consisting of gallium, indium, hafnium, tantalum and boron.

It is desirable to use whisker growth enhancing compounds and derivatives of magnesium and yttrium in the form of powders which are pure and sufficiently small in size. Purity is not typically a problem, because commercially available materials used as whisker growth enhancing compounds, densification aids and conversion aids, particularly the oxide powders, generally contain less than 20 ppm each of assorted impurities. These levels of impurities are tolerable. Larger amounts of impurities, as for example in the 0.5 weight percent range, are not recommended as they may cause a change in the final ceramic composition and properties. A small powder particle size is favored, because dispersion is enhanced by smaller particles. Preferably, the oxide powders have an average particle size no greater than about 5 μm in diameter.

Certain elements, e.g., sodium and potassium, may be used as a densification aid, a conversion aid or a whisker growth enhancing compound in a given powder mixture. No single element may, however, be used in an amount sufficient to function as two or more of these functions, e.g., as both a densification aid and a conversion aid.

It has now been found that incorporation into the powder mixture of a Palmqvist toughness enhancing amount of at least one preformed reinforcing material improves properties of the resultant silicon nitride body. Properties which are improved include room temperature toughness and high temperature strength and stiffness. The material is selected from the group consisting β-silicon nitride fibers or whiskers or silicon carbide, titanium carbide, boron carbide, titanium diboride, aluminum oxide or zirconium oxide in at least one form selected from the group consisting of whiskers, fibers, particles and platelets.

The reinforcing material must be chemically compatible with the glassy phase and its components. Chemically compatible materials are selected from the group consisting of boron carbide, silicon carbide, titanium carbide, aluminum oxide, zirconium oxide and titanium diboride. Materials which are normally chemically incompatible with the glassy phase and its components may be rendered compatible by coating them with one of the aforementioned chemically compatible elements. Normally incompatible materials include aluminum nitride, magnesium oxide and mullite. Titanium carbide provides a satisfactory coating for the latter group of materials.

The reinforcing material must be present in an amount which is sufficient to enhance the Palmqvist toughness of the resultant silicon nitride body without substantially interfering with or eliminating the formation of elongated silicon nitride grains. The reinforcing material, when present, occupies space in the glassy phase in which elongated silicon nitride grains would otherwise grow in its absence. The amount of reinforcing material varies with the size of reinforcing material pieces, particles, fibers or whiskers as well as the volume occupied by the reinforcing material. Polycrystalline fibers provide acceptable results as a nominally continuous reinforcing material. Single crystal whiskers also provide acceptable results, albeit as a nominally discontinuous reinforcing material.

As a general rule, a given volume percentage of large particles, fibers, etc., will interfere less with formation of the elongated silicon nitride grains than an equal volume percentage of smaller particles, etc. Accordingly, satisfactory results are obtained with any of the following combinations of reinforcement material diameter and volume percentages, based upon glassy phase volume: (a) less than 0.2 μm diameter, up to about 10 volume percent; (b) from 0.2 μm to about 0.5 μm diameter, up to about 15 volume percent; (c) from 0.5 μm to about 1.5 μm diameter, up to about 25 volume percent; (d) from 1.5 μm to about 2.5 μm diameter, up to about 30 volume percent; (e) from 2.5 μm to about 5.0 μm diameter, up to about 35 volume percent; (f) from 5.0 μm to about 15.0 μm diameter, up to about 45 volume percent; (g) from 15.0 μm to 25.0 μm diameter, up to about 50 volume percent; and (h) greater than 25.0 μm diameter, up to about 65 volume percent. Irrespective of the reinforcing material diameter, the amount of reinforcing material, where used, is beneficially greater than about 5 volume percent. The reinforcing materials have different densities. As such, a universal weight percentage is not applicable. The weight percentages corresponding to the foregoing volume percentages are readily determined given the density of a particular reinforcing material.

In the process of this invention, it is required to mix the starting silicon nitride powder, described hereinabove, with a combination of a densification aid, a conversion aid, a whisker growth enhancing compound and, optionally, a reinforcing material to obtain a powder mixture, which is used in preparing the tough silicon nitride ceramic body of this invention. The reinforcing material, when present, is beneficially added to the remaining components of the powder mixture after they are well mixed to minimize breakage or comminution of reinforcement material pieces, etc. Suitable densification aids, conversion aids and whisker growth enhancing components are disclosed hereinabove. Ordinarily, the total quantity of the derivative of magnesium, the derivative of yttrium densification aid, conversion aid and the whisker growth enhancing compound is no greater than about 35 weight percent of the total weight of the powder mixture. The 35 weight percent limit is also appropriate when a reinforcing material is used. The total quantity will depend, however, on probable end use applications for fired ceramics prepared from the powder mixture. For some applications, total quantities in excess of 35 weight percent will provide acceptable results. Preferably, however, the total quantity is in the range from about 5 weight percent to about 35 weight percent for medium temperature and/or the highest fracture toughness applications. By "medium temperature", it is meant temperatures in the range from about 900° C. to about 1200° C. Ceramic cutting tools are an example of a medium temperature and very high fracture toughness application. Preferably, the total quantity is in the range from about 0.25 weight percent to about 5 weight percent for high temperature and/or moderately high fracture toughness applications. By "high temperature", it is meant temperatures from about 1200° C. to about 1400° C. Parts for ceramic engines are an example of a high temperature and moderately high fracture toughness application.

The preparation of the powder mixture containing silicon nitride, densification aid(s), conversion aid(s) and whisker growth enhancing compound(s), is accomplished in any suitable manner. Ball-milling of the components in powder form is one acceptable manner of preparation.

The preferred method of preparing the powder mixture comprises use of an attritor with zirconia balls to prepare a finely-divided suspension of silicon nitride and a powdered combination of the densification aid(s), the conversion aid(s) and the whisker growth enhancing compound(s) in a carrier medium, drying an admixture of the suspension and the attritor balls, beneficially after removing, by filtration or otherwise, excess carrier medium, and thereafter separating the attritor balls to obtain the powder mixture.

The preparation of the finely-divided suspension of silicon nitride and the combination of the densification aid(s), the conversion aid(s) and the whisker growth enhancing compound(s) in a carrier medium requires no particular order of addition of the components. For example, it is possible to add the powdered combination or powdered components thereof to a colloidal suspension of silicon nitride in a carrier medium or vice versa. Alternatively, all components of the powder mixture may be added simultaneously to the carrier medium prior to attritor milling. The latter method is preferred, particularly when an organic carrier medium such as toluene or an alcohol is employed.

The carrier medium may be any inorganic or organic compound which is a liquid at room temperature and atmospheric pressure. Examples of suitable carrier media include water; alcohols, such as methanol, ethanol and isopropanol; ketones, such as acetone and methyl ethyl ketone; aliphatic hydrocarbons, such as pentanes and hexanes; and aromatic hydrocarbons, such as benzene and toluene. The carrier medium is desirably an organic liquid, preferably toluene or an alcohol such as methanol. The function of the carrier medium is to impart a viscosity suitable for mixing to the solid powders. Any quantity of carrier medium which achieves this purpose is sufficient and acceptable. Preferably, a quantity of carrier medium is employed such that the solids content is in the range from about 20 volume percent to about 50 volume percent. More preferably, a quantity of carrier medium is employed such that the solids content is in the range from about 35 volume percent to about 45 volume percent. Below the preferred lower limit the viscosity of the solid suspension may be too low and the deagglomeration mixing may be ineffective. Above the preferred upper limit the viscosity may be too high, and the deagglomeration mixing may be difficult.

The components of the powdered combination are added to the carrier medium in any manner which gives rise to a finely dispersed suspension of the components. Typically, the process is conducted in a large vessel at room temperature (taken as 23° C.) under air with vigorous stirring. Any common stirring means is suitable, such as a ball-milling device or an attrition mixer. An ultrasonic vibrator may be used in a supplementary manner to break down smaller agglomerates. The attrition mixer is preferred.

To aid in the dispersion of components of the powder mixture, optionally one or more surfactants or dispersants can be added to the suspension. The choice of surfactant(s) or dispersant(s) can vary widely as is well-known in the art.

If the carrier medium is toluene, a coupling agent, such as an aluminate coupling agent commercially available from Kenrich Petrochemicals under the trade designation KEN-REACT KA 322, may be used to aid in forming a suspension. When using an alcohol such as methanol, a dispersant such as a polyethyleneimine may be used to facilitate mixing and a flocculant such as oleic acid may be used to ease recovery of the powder mixture.

Any amount of surfactant or dispersant is acceptable providing dispersion of powder mixture components is improved. Typically, the amount of surfactant is in the range from about 0.01 to 1.0 weight percent of the powder mixture.

The finely-divided suspension is now ready for processing into greenware. For example, the suspension can be slip-cast by techniques well-known in the art for eventual sintering. Alternatively, the suspension can be dried into a powder and ground for use in hot-pressing processes. Drying is accomplished by standard drying means, such as by spray-drying or oven drying under a nitrogen purge. Preferably, drying of the admixture of the powder mixture and the attritor balls is accomplished in an oven under a nitrogen purge after removal of excess carrier medium. During the drying process, additional free carrier medium is removed. The temperature of the drying depends on the boiling point of the carrier medium employed. Typically, the drying process is conducted at a temperature just below the boiling point of the carrier medium under atmospheric pressure. Preferably, the carrier medium is toluene or an alcohol and the temperature of drying is about 50° C. After drying, the resulting powder is separated from the attritor balls and sieved through a screen to obtain a powder having a maximum agglomerate diameter of about 100 μm. The screen size is usually less than about 60 mesh (250 μm); more preferably, less than about 80 mesh (180 μm). The powder which is obtained on sieving is the powder mixture which is used in the hot-pressing process of this invention.

When reinforcing materials are included in the powder mixture, the foregoing procedure is modified depending upon the form of the reinforcing material. If the reinforcing material is in a form other than long or continuous fibers, the reinforcing material is added to the finely dispersed suspension of components and mixed or attrited for a suitable length of time. Attrition time largely depends upon a balancing of the extent of reinforcing material agglomeration with its friability or fragility. In other words, attrition time is long enough to break up most, if not all, of the agglomerates. It is also short enough to maintain sufficient reinforcing material integrity to provide a desired degree of reinforcement. The additional attrition time will also depend upon the reinforcing material. A typical time need to accomplish dispersion of the reinforcing material will vary from about 10 minutes to about 45 minutes. The time is beneficially from about 10 to about 20 minutes. If the reinforcing material is in the form of fibers, also known as continuous fibers, no additional attrition time is required. The fibers are suitably immersed in the finely dispersed suspension to deposit a coating of the suspension on their outer surface. The fibers are then removed from the suspension and dried before further processing. If desired, multiple coatings may be applied in this manner. The dried, coated fibers, whether in the form of single fibers or a fiber mat or fabric, are beneficially surrounded by the powder mixture in a hot-pressing die and then hot-pressed as described herein. Other known methods of processing fibers may also be used.

The preferred method of processing the powder mixture is by hot-pressing, which comprises heating the powder under pressure to obtain the densified ceramic body. Any standard hot-pressing equipment is acceptable, such as a graphite die equipped with a heating means and a hydraulic press. Particularly suitable results are obtained when the die is fabricated from a material which is substantially non-reactive with components of the powder mixture at hot-pressing temperatures and has a mean linear coefficient of expansion greater than silicon nitride. The use of such a die material aids in the preparation of near net shapes without post-densification machining operations. The die material is desirably titanium carbide. R. Morrell, Handbook of Properties of Technical and Engineering Ceramics, pages 82-83 (1985), lists the mean linear coefficients respectively for silicon nitride and titanium carbide as $3.6 \times 10^{-6} k^{-1}$ and $8.2 \times 10^{-6} K^{-1}$. The hot-pressing is conducted under an inert atmosphere, such as nitrogen, to prevent the oxidation and decomposition of silicon nitride at high temperatures. The direction of pressing is uniaxial and perpendicular to the plane of the die plates.

Any processing temperature and pressure will suffice providing the novel silicon nitride ceramic of this invention, described hereinbelow, is obtained. Typically, however, the temperature must be carefully controlled, because the elongated β-silicon nitride whiskers are found to form in a narrow temperature range. Preferably, the temperature is maintained during pressurizing in the range from about 1750° C. to about 1870° C. More preferably, the temperature is maintained in the range from about 1800° C. to about 1850° C. Most preferably, the temperature is maintained in the range from about 1820° C. to about 1840° C. Below the preferred lower temperature limit the formation of elongated β-silicon nitride whiskers may be retarded. Above the preferred upper temperature limit the silicon nitride may decompose, and special pressure equipment may be required to conduct the densification. In the absence of a reinforcing material, the use of high pressure techniques such as hot isotatic pressing may allow use of higher temperatures, e.g. up to 2000° C. or even 2100° C. It is noted that the accurate measurement of high temperatures, such as those quoted hereinabove, is technically difficult. Some variation in the preferred temperature range may be observed depending on the method employed in measuring the temperature. The preferred temperatures of this invention are measured by use of a tungsten-rhenium thermocouple, obtained from and calibrated by the Omega Company.

While the pressure during hot-pressing is important, it is not quite as critical a parameter as temperature. Typically, the pressure should be sufficient to cause densification of the green body. Preferably, the pressure is in the range from about 3000 psig to about 6000 psig; more preferably, from about 4000 psig to about 5500 psig; most preferably, about 4500 psig to about 5200 psig. Below the preferred lower pressure limit the powder will not be sufficiently densified. Above the preferred upper pressure limit the powder will densify in a shorter time and at a lower temperature. Although less rigorous processing conditions seem on the surface to be desirable, the formation of elongated β-silicon nitride crystals may be inhibited at lower temperatures and shorter pressing times.

The amount of time that the powder mixture is heated under pressure should be sufficient to bring the powder to essentially complete densification. Generally, ram movement is a good indicator of the extent of densification. As long as the ram continues to move, the densification is incomplete. When the ram has stopped moving for at least about 15 minutes, the densification is essentially complete at about 99 percent or greater of the theoretical value. Thus, the time required for hot-pressing is the time during ram movement plus about an additional 15 to 30 minutes. Preferably, the time is in the range from about 15 minutes to about 2 hours; more preferably, from about 30 minutes to about 90 minutes; most preferably, about 45 minutes to about 75 minutes.

The hot-pressing method of densification, described hereinbefore, allows for the formation of silicon nitride ceramic articles which can be used as cutting tools. A variety of shapes can be made by hot-pressing, one common shape being a flat plate. These plates may range in size from about 2 inches in length by about 1.5 inches in width by about 0.45 inch in thickness to about 16 inches (40.6 cm) in length by about 16 inches (40.6 cm) in width by about 1.0 inch (2.5 cm) in thickness. Smaller and larger plates can also be fabricated, as determined by the size of the hot-pressing plaques. Cutting tools can be fabricated by slicing and grinding these plates into a variety of cutting tool shapes.

The silicon nitride ceramic body which is produced by the hot-pressing process of this invention is a dense material having no significant porosity. Preferably, densification proceeds to greater than 95 percent of the theoretical value; more preferably, to greater than 97 percent of the theoretical value; most preferably, to greater than 99 percent of the theoretical value. Moreover, as measured by X-ray diffraction, the silicon nitride is present in the beta crystalline form, indicating essentially complete alpha to beta conversion during processing. Quite unexpectedly, the β-silicon nitride is present predominately as single crystal, "needle-like"

whiskers or elongated grains, as determined by both scanning electron microscopy (SEM) and transmission electron microscopy (TEM). The size of the hexagonal β-silicon nitride grains is usually in the range from about 1 μm to about 20 μm in length with a mean diameter of from about 0.2 μm to about 1.5 μm; preferably from about 3 μm to about 10 μm in length with a mean diameter from about 0.3 μm to about 1.0 μm.

Since the whiskers are oriented randomly, it is difficult to determine exactly the percentage of silicon nitride which exists as whiskers, as opposed to equiaxed particles. The measurement is made by viewing one plane of the silicon nitride ceramic in a scanning electron microscope (SEM) and measuring the percentage by volume occupied by whiskers having an aspect ratio between 2 and 16. It is observed that the whiskers are homogeneously distributed and randomly oriented throughout the ceramic body, and that the volume occupied by the whiskers is approximately the same in all planes. Typically, the percentage of silicon nitride whiskers having an aspect ratio of between 2 and 16 is at least about 20 volume percent as measured in a plane. Preferably, the percentage of silicon nitride whiskers having an aspect ratio between 2 and 16 is at least about 35 volume percent as measured in a plane. Unexpectedly, the whiskers are found to have a high average aspect ratio. Typically, the average aspect ratio of the silicon nitride whiskers is at least about 2.5; preferably, at least about 5.5. It is noted that because the aspect ratio is measured in a plane, the average aspect ratio is a lower bound. For example, a whisker which is perpendicular to the plane may have an apparent aspect ratio of less than 2; whereas the true aspect ratio may be very much greater than 2.

In addition to the β-silicon nitride phase, the ceramic body of this invention contains a glassy second phase, which constitutes no greater than about 35 weight percent of the total weight. The glassy second phase has a bulk chemical composition consisting essentially of from about 8 weight percent to about 60 weight percent of a densification aid, from about 15 weight percent to about 64 weight percent of a conversion aid, from about 7 weight percent to about 77 weight percent silica, and from about 0.1 weight percent to about 25 weight percent of at least one whisker growth enhancing compound, as determined by neutron activation analysis; and wherein the conversion aid to densification aid weight ratio is in the range from about 0.25 to about 8.

Small quantities of other phases may be present in a total amount not exceeding about 10 weight percent. One of the phases, enstatite, possesses a fiber-like, layered and ordered structure. The typical size of the particles of this phase is about 500 nanometers (nm) in width by about 0.7 μm to 1.0 μm in length. This phase, being distributed throughout the glassy phase, connects and bridges $Si_3N_4$ whiskers. In other words, unique microstructures can be created with small needles or fibers of enstatite situated between comparatively large $Si_3N_4$ whiskers or particles.

The mechanical properties of the self-reinforced silicon nitride ceramic body are readily measured by use of standard tests. In particular, fracture toughness ($K_{IC}$) is measured according to the Chevron notch and the Palmqvist methods described hereinafter. Fracture strength (modulus of rupture) is measured according to the Military Standard 1942b test. Hardness is measured according to the Vickers indentation test.

Fracture strength (modulus of rupture) measures the resistance of the material to fracture under a steady load. Fracture strength is defined as the maximum unit stress which the material will develop before fracture occurs. Test bars are prepared by cutting rectangular bars (45 mm × 4 mm × 3 mm) of the silicon nitride ceramic in a plane perpendicular to the pressing direction. The bars are ground on the surfaces parallel to the pressing plates using a 500 grit grinding wheel (Military Standard 1974). The fracture strength is measured at room temperature using a 4-point bend test with 20 mm span and crosshead speed of 0.5 mm/min. Typically, the fracture strength at room temperature is at least about 650 MPa. Preferably, the fracture strength at room temperature ranges from about 825 MPa to about 1250 MPa; more preferably, from about 1000 MPa to about 1150 MPa. High temperature strength is measured using a 3-point bend test with 20 mm span and crosshead speed of 0.5 mm/min. Typically, at 1000° C. the fracture strength is at least about 550 MPa. Typically, at 1300° C. the fracture strength is at least about 300 MPa.

Toughness measures the resistance of the material to fracture under a dynamic load. More specifically, fracture toughness is defined as the maximum amount of energy which a unit volume of material will absorb without fracture. In the present invention two methods are employed to measure fracture toughness. The first of these is the Chevron notch test. Test bars are prepared as described hereinabove, and additionally scored with a Chevron notch. The test bars are then subjected to a 3-point bend test with 40 mm span and crosshead speed of 0.5 mm/min. Typically, the fracture toughness of the silicon nitride ceramic body of this invention, as measured at room temperature (taken as 23° C.) by the Chevron notch technique, is greater than about 6 MPa $(m)^{\frac{1}{2}}$. Preferably, the room temperature fracture toughness is greater than about 7 MPa $(m)^{\frac{1}{2}}$; more preferably, greater than about 8 MPa $(m)^{\frac{1}{2}}$. Most preferably, the room temperature fracture toughness ranges from about 9 MPa $(m)^{\frac{1}{2}}$ to about 14 MPa $(m)^{\frac{1}{2}}$. Preferably, at 1000° C. the fracture toughness is greater than about 6 MPa $(m)^{\frac{1}{2}}$. More preferably, at 1000° C. the fracture toughness ranges from about 7 MPa $(m)^{\frac{1}{2}}$ to about 12 MPa $(m)^{\frac{1}{2}}$.

In the evaluation of cutting tool materials it is useful to measure the Palmqvist toughness and the Vickers hardness. Both measurements can be made simultaneously on one test sample, and therefore these tests are very convenient.

The Vickers hardness test measures the resistance of the ceramic material to indentation. A sample, approximately 1 cm in length by 1 cm in width by 1 cm in height, is placed on a flat surface, and indented with a standard Vickers diamond indentor at a crosshead speed of 0.02 in/min. The Vickers hardness number is calculated from the applied load, in this case 14 kg, and the cross-sectional area of the indentation. Prior to making the test, the test sample is polished in a special manner. First, the sample is cleaned and rough spots are flattened by use of a 220-grid diamond wheel. Next, a 45-micron diamond wheel is used to start the polishing. Next, the sample is treated to a series of polishings at 30 psi and 200 rpm in the following consecutive manner: three five-minute intervals with 30-micron diamond paste, three five-minute intervals with 15-micron diamond paste, three five-minute intervals with 6-micron diamond paste, two five-minute intervals with 1-micron diamond paste, and one five-minute interval with 0.25-micron diamond paste. Between each interval the sample is thoroughly cleansed by washing with water and sonicating for two minutes. The Vickers hardness number of the silicon nitride ceramic of this invention is at least about 1325 kg/mm$^2$ at room temperature. Preferably, the Vickers hardness number ranges from about 1340 kg/mm$^2$ to about 1600 kg/mm$^2$ at room temperature; more preferably, from about 1450 kg/mm$^2$ to about 1600 kg/mm$^2$.

The Palmqvist toughness test is an extension of the Vickers test. (See S. Palmqvist in *Jerndontorets Annalen*, 141 (1957), 300, for a description of the Palmqvist toughness test.) The test sample is prepared and indented as in the Vickers test, but the 14-kg load is additionally held for 15 seconds. The sample cracks. The measurements of the indented diagonals and the crack lengths are made on a Nikon UM2 microscope at 1000x magnification. The Palmqvist toughness (W) is directly proportional to the applied load (P) and inversely proportional to the crack length (L). Preferably, the silicon nitride ceramic body of this invention exhibits a Palmqvist toughness at room temperature of at least about 37 kg/mm. Preferably, the silicon nitride ceramic body of this invention exhibits a Palmqvist toughness at room temperature in the range from about 37 kg/mm to about 52 kg/mm; more preferably, from about 45 kg/mm to about 52 kg/mm.

ILLUSTRATIVE EMBODIMENTS

The following examples serve to illustrate the novel self-reinforced silicon nitride composition of this invention, the method of preparing the novel silicon nitride ceramic, and the utility of the composition as a cutting tool. The examples are not intended to be limiting of the scope of this invention. All percentages are weight percent unless otherwise noted.

EXAMPLE 1

Materials: Silicon nitride (KemaNord P95-H) is employed containing 1.81 percent oxygen, 0.6 percent carbon, and the following major metallic impurities: 641 ppm iron, 315 ppm Al, and 25 ppm Ti. The silicon nitride is present in the alpha and beta crystalline forms in an $\alpha/\beta$ weight ratio of 95/5. The BET surface area of the silicon nitride powder is 10.15 m$^2$/g and the average particle size is about 1 μm in diameter. Magnesium oxide (J. T. Baker) is employed containing less than 5 ppm each of boron, zinc, and iron. Greater than 80 percent of the MgO particles range in size from 0.2 μm to 0.7 μm in diameter. Yttrium oxide (Molycorp) is employed containing less than 10 ppm each of sodium and iron. The Y$_2$O$_3$ particles range in size from 2 μm to 5 μm in diameter. Calcium oxide (Aldrich Chemical Co.) is employed containing less than 0.002 percent each of lead and iron. The average CaO particle size is about 3 μm in diameter.

The above-identified magnesium oxide (4.7 g) and calcium oxide powders (0.2 g) are suspended in 80 ml of water, and agitated at room temperature under air by means of a mechanical stirrer to form a two-oxide suspension. The pH of the suspension is adjusted to 11.35 by the addition of aqueous sodium silicate (7 drops). After adjustment of the pH, the suspension is ultrasonicated for 30 seconds to break down fine agglomerates. After sonication the pH is observed to drop. The pH is readjusted to 11.5 by adding 5 drops of 5 M sodium hydroxide. The suspension is mixed for about 30 minutes. Yttrium oxide powder (8.5 g), described hereinabove, is added to the suspension, and the suspension is sonicated for 30 seconds and mixed with a mechanical stirrer for 30 minutes. Silicon nitride powder (86.6 g), described hereinabove, is added to the suspension, and the suspension is mixed in an attrition mixer for about 30 minutes to ensure complete dispersion of all components. The resulting suspension is poured through a 100 mesh nylon sieve. The pH is adjusted to 9.8 by adding 10 ml of 50 percent nitric acid to increase the flocculation slightly. The finely divided suspension is dried in an oven at 90° C. for a period of 12 hours under a flow of dry nitrogen gas. After drying, the resulting powder mixture is passed through a 60 mesh sieve. The powder mixture is composed of 86.6 percent silicon nitride, 4.5 percent magnesium oxide, 8.5 percent yttrium oxide, and 0.2 percent calcium oxide.

The powder mixture (80 g), described hereinabove, is poured into a graphite die in the shape of plates measuring 2 inches in length by 1.5 inches in width by 0.5 inches in depth. A pressure of 1000 psig is applied to the die, while the temperature is raised from ambient to about 1200° C. in about 30 minutes. At about 1200° C. the pressure is gradually increased to 5000 psig and maintained thereat. The temperature is then increased to 1825° C. over a 40-minute period. The die is maintained at 1825° C. and a pressure of 5000 psig for 45 minutes. Afterwards the die is cooled over a 2 hour period to 100° C. At 1500° C. the pressure is slowly released. When the die reaches room temperature, it is opened, and a silicon nitride ceramic body in the shape of a plate having the above-identified dimensions is retrieved.

The density of the silicon nitride ceramic body, prepared hereinabove, is measured by the water immersion method, as described in "Modern Ceramic Engineering" by D. W. Richerson, Marcel Dekker, 1982, and by stereology analysis from SEM photomicrographs. The density is essentially 100 percent of theoretical, and therefore the material is essentially nonporous. Silicon nitride is present essentially in the $\beta$ crystalline phase, as determined by X-ray diffraction. The bulk chemical composition of the ceramic is determined by neutron activation analysis, and is found to contain 77.2 percent silicon nitride, 20.4 percent glassy second phase, and 2.4 percent silicon carbide. The glassy second phase is found to consist of 32.4 percent magnesium oxide, 42.2 percent yttriumoxide, 2.5 percent calcium oxide, and 23.0 percent silicon oxide. Two unidentified phases are found. The first is present in a quantity of 3.9 percent, and possesses a composition of 9 percent magnesium, 59 percent silicon and 32 percent nitrogen. The second is present in a quantity of 1 percent, and possesses a fiber-like, layered and ordered structure typically 500Å in width and 0.7 μm in length. The microstructure of the silicon nitride ceramic, prepared hereinabove, is determined by scanning electron microscopy (SEM), as viewed in a plane. About 35 volume percent of the silicon nitride appears in the form of elongated whiskers having an aspect ratio ranging from 2 to 16. The average aspect ratio is 5.6.

The fracture strength of the above-identified silicon nitride ceramic body, measured by the 4-point bend test described hereinbefore, is 130 ksi (890 MPa) at room temperature and 90 ksi (616 MPa) at 1000° C. The fracture toughness measured by the Chevron notch technique is 13.9 MPa (m)$^{\frac{1}{2}}$ at room temperature and 11.5 MPa (m)$^{\frac{1}{2}}$ at 1000° C. The Vickers hardness measured at room temperature and under a 14-kg load ranges from 1350 kg/mm² to 1400 kg/mm² and averages 1375 kg/mm². The Palmqvist toughness measured at room temperature ranges from 49.3 kg/mm to 51.1 kg/mm. It is seen that the fracture toughness of this silicon nitride ceramic body is very high.

EXAMPLES 2 (a–n)

A series of hot-pressed silicon nitride ceramic compositions is prepared according to the procedure of Example 1, except that the composition of the powder mixture is varied as described in Table I. The Vickers hardness and the Palmqvist toughness measured at room temperature are presented in Table I for each composition.

TABLE I*

| Ex 2 | % $Si_3N_4$ | % MgO | % $Y_2O_3$ | % CaO | $Y_2O_3$/ MgO | Palmqvist Toughness (kg/mm) | Vickers Hardness (kg/mm²) |
|---|---|---|---|---|---|---|---|
| a | 86.10 | 2.65 | 11.20 | 0.05 | 4.23 | 36.9 | 1461 |
| b | 86.45 | 3.50 | 10.00 | 0.05 | 2.85 | 40.2 | 1403 |
| c | 86.65 | 4.30 | 9.00 | 0.05 | 2.10 | 39.6 | 1353 |
| d | 86.75 | 4.70 | 8.50 | 0.05 | 1.81 | 42.2 | 1442 |
| e | 87.05 | 5.40 | 7.50 | 0.05 | 1.39 | 40.6 | 1392 |
| f | 87.25 | 6.10 | 6.60 | 0.05 | 1.10 | 42.4 | 1379 |
| g | 87.65 | 7.20 | 5.10 | 0.05 | 0.70 | 38.9 | 1324 |
| h | 86.40 | 3.50 | 10.00 | 0.10 | 2.85 | 44.5 | 1392 |
| i | 86.70 | 4.70 | 8.50 | 0.10 | 1.81 | 47.5 | 1401 |
| j | 87.60 | 7.20 | 5.10 | 0.10 | 0.70 | 40.2 | 1385 |
| k | 86.60 | 4.70 | 8.50 | 0.20 | 1.81 | 51.0 | 1391 |
| l | 86.60 | 4.70 | 8.20 | 0.50 | 1.82 | 47.6 | 1380 |
| m | 86.30 | 4.50 | 8.20 | 1.00 | 1.82 | 44.2 | 1375 |
| n | 85.30 | 4.50 | 8.20 | 2.00 | 1.82 | 40.1 | 1370 |

*Percentages of components are based on weight percent in the powder mixture. Toughness and hardness values are measured at room temperature.

The data show that the Palmqvist toughness and the Vickers hardness vary as a function of the calcium oxide concentration and the $Y_2O_3$/MgO weight ratio in the powder mixture. For example, it is seen in Examples 2(d,i,k,l,m,n) that as the calcium oxide concentration increases at constant $Y_2O_3$/MgO ratio, the fracture toughness passes through a maximum value of 51 kg/mm at a calcium oxide concentration of 0.20 weight percent. As the calcium oxide concentration increases at constant $Y_2O_3$/MgO ratio, the hardness decreases.

COMPARATIVE EXPERIMENTS 1(a–d)

Four hot-pressed silicon nitride ceramic bodies are prepared as in Example 1, except that calcium oxide is omitted from the preparation. The powder compositions are listed in Table II. The Vickers hardness and the Palmqvist toughness are measured as described in Example 2, and the values are tabulated in Table II.

TABLE II*

| Comp. Ex. 1 | % $Si_3N_4$ | % MgO | % $Y_2O_3$ | $Y_2O_3$/ MgO | Palmqvist Toughness (kg/mm) | Hardness (kg/mm²) |
|---|---|---|---|---|---|---|
| a | 86.40 | 3.60 | 10.00 | 2.78 | 36.6 | 1407 |
| b | 86.80 | 4.70 | 8.50 | 1.81 | 36.1 | 1377 |
| c | 87.75 | 7.20 | 5.05 | 0.70 | 36.1 | 1438 |
| d | 93.20 | 2.42 | 4.38 | 1.81 | 35.8 | 1395 |

*Percentages of components are based on weight percent in the powder mixture. Toughness and hardness values are measured at room temperature.

When Comparative Experiments 1(b,d) are compared with Examples 2(d,i,k,l,m,n) it is seen that the self-reinforced silicon nitride ceramic body of this invention possesses a significantly higher Palmqvist toughness than the samples which do not contain calcium oxide. The same conclusion holds on comparing Comparative Experiment 1(a) with Examples 2(b and h). Even at a low $Y_2O_3$/MgO ratio and a low calcium oxide concentration, the improvement in the ceramic body of this invention is noticeable, as seen in the comparison between Comparative Experiment 1(c) and Examples 2(g and j).

EXAMPLES 3(a–c)

Three hot-pressed silicon nitride compositions are prepared according to the procedure of Example 1, except that the powder compositions are varied as described in Table III. The $Y_2O_3$/MgO ratio in these powder compositions is 1.82. The Palmqvist toughness and the Vickers hardness are measured at room temperature according to the procedure in Example 2. The values obtained are presented in Table III.

TABLE III*

| Ex 3 | % $Si_3N_4$ | % MgO | % $Y_2O_3$ | % CaO | % Glass Content | Palmqvist Toughness (kg/mm) | Hardness (kg/mm²) |
|---|---|---|---|---|---|---|---|
| a | 93.15 | 2.40 | 4.35 | 0.10 | 6.85 | 39.9 | 1371 |
| b | 86.70 | 4.70 | 8.50 | 0.10 | 13.30 | 46.2 | 1396 |
| c | 80.40 | 6.90 | 12.60 | 0.10 | 19.60 | 48.3 | 1389 |

*Percentages of components are based on weight percent in the powder mixture. Toughness and hardness values are measured at room temperature.

The data show that as the glass content increases, the Palmqvist toughness also increases; whereas the Vickers hardness varies in a non-linear fashion.

EXAMPLE 4

The hot-pressed silicon nitride ceramic body of Example 1 is diamond ground into a cutting tool insert. The cutting tool insert is made according to the ANSI standards in the SNG 433 style. The cutting edge is chamfered at a 20° angle by 0.008-inch width. The insert is tested in a face milling application using a 40 HP Cincinnati #5 single spindle, knee and saddle, vertical milling machine with a 5 HP variable speed table. The work material is a nodular "ductile" cast iron measuring 2 inches in diameter and having a measured hardness of 207 BHN. A milling cutter having a 6-inch diameter is used with a −5° axial rake and a −5° radial rake. A 15° lead angle is employed. The machine is run at a cutting speed of 1360 surface feet per minute, a 0.060-inch depth of cut, and a feed rate of 0.005 inch per revolution (or tooth). The center line of the cutter and the center line of the workpiece are coincident. No cutting fluid is used. Successive passes are taken on the cast iron, and the cutting edge is examined for flank wear and chippage after every 8 passes. Testing is terminated when the flank wear or chippage exceeds 0.015 inch in depth as measured with a 30-power microscope. It is found that an average of 26.0 passes are achieved prior to failure. The flank wear is uniform.

COMPARATIVE EXPERIMENT 2 (a–b)

A commercial silicon nitride ceramic body is obtained from each of the following sources: (a) Boride Products (Product No. US-20) and (b) GTE Valeron Corporation (Product No. Q6). Each sample is diamond ground into a cutting tool in the manner described in Example 4. The cutting tools are used to cut nodular "ductile" cast iron in the manner described in Example 4. It is found that an average of 13.5 passes of the Boride Products sample are achieved prior to failure, and an average of 10.5 passes of the GTE sample are achieved prior to failure. In both cases the flank wear is uniform. When Comparative Experiments 2(a and b) are compared with Example 4, it is seen that the silicon nitride ceramic body of this invention significantly outperforms the commercial products.

EXAMPLES 5(a-w)

Effect of Various Whisker Growth Enhancing Compounds Upon the Properties of Self-Reinforced $Si_3N_4$ A series of hot-pressed silicon nitride compositions is prepared using a variation of the procedure described in Example 1 as well as a different silicon nitride powder and a variety of elements to be evaluated for use as whisker growth enhancing compounds. The elements and the resultant physical properties are listed in Table IV. The physical properties include fracture strength (modulus of rupture) measured according to Military Standard 1942b, fracture toughness (Chevron notch technique) and Hardness (Vickers indentation test). The silicon nitride powder is commercially available from Ube Industries, Ltd. under the trade designation SN-E10. It contains 1.46 percent oxygen, less than 100 ppm Cl, less than 100 ppm Fe, less than 50 ppm Ca, and less than 50 ppm Al. It has a crystallinity of greater than 99.5 percent, a ratio of $\alpha/(\alpha-\beta)$ of less than five and a surface area of 11.2 m²/g.

$K_2CO_3$ and $Na_2CO_3$, both commercially available from Fisher Scientific, are suitable sources, respectively for $K_2O$ and $Na_2O$. Fisher Scientific also supplies $La_2O_3$, $ZrO_2$, $Cr_2O_3$, $WO_3$, $MnO_2$ and $Fe_2O_3$. Morton Thiokol supplies SrO and $V_2O_4$. Matheson, Coleman and Bell supply BaO. Baker Incorporated supplies $TiO_2$, NiO and CaO. Alfa Products supplies $Sc_2O_3$, $NbB_2$, CoO, ZnO, $Ga_2O_3$, $In_2O_3$, $HfO_2$, $Ta_2O_5$, $B_2O_3$ and CuO.

The materials are mixed in an attritor (Union Process batch attritor, Model 01HD - 750 cc capacity with polytetrafluoroethylene coated tube and stirrer) containing zirconia balls with a stirring rate of 330 revolutions per minute (rpm). A mixture of 225 ml toluene and 25 drops of an aluminate coupling agent, commercially available from Kenrich Petrochemicals under the trade designation Kenreact KA 322, is used as a mixing medium. The silicon nitride powder (86.3 g), the magnesium oxide powder (4.7 g), the yttrium oxide powder (8.5 g) and the powdered elemental derivative identified in Table IV (0.5 g) are added to the mixing medium and agitation is started. After about thirty minutes of mixing, an additional 100 ml of toluene is added and the agitation stirring rate is increased to 630 rpm for a period of two minutes to thin the mixture before removing it from the attritor together with the zirconia balls. Excess toluene is removed by vacuum filtration. The mixture is then dried under a flow of dry nitrogen gas. After drying, the mixture is separated from the zirconia balls using a 30 mesh stainless steel sieve and subsequently passed through 40 mesh and 60 mesh stainless steel sieves to provide a dried powder mixture composed of 86.3 percent silicon nitride, 4.7 percent magnesium oxide, 8.5 percent yttrium oxide and 0.5 percent derivative. The powder is then hot-pressed into plates and subjected to physical property testing as described in Example 1.

TABLE IV

| Ex. 5 | Additive/ Derivative | Fracture Strength (MPa) | Fracture Toughness (MPa·m$^{\frac{1}{2}}$) | Vickers Hardness (kg·mm$^{-2}$) |
|---|---|---|---|---|
| a | $K_2O$ | 1062 | 8.43 | 1516 |
| b | $Na_2O$ | 869 | 8.65 | 1555 |
| c | SrO | 869 | 8.56 | 1604 |
| d | BaO | 917 | 8.83 | 1486 |
| e | $Sc_2O_3$ | 896 | 8.36 | 1520 |
| f | $La_2O_3$ | 862 | 7.71 | 1515 |
| g | $TiO_2$ | 1145 | 10.32 | 1526 |
| h | $ZrO_2$ | 972 | 8.0 | 1512 |
| i | $V_2O_4$ | 1069 | 8.36 | 1514 |
| j | $NbB_2$ | 1034 | 8.21 | 1500 |
| k | $Cr_2O_3$ | 1034 | 8.1 | 1512 |
| l | $WO_3$ | 958 | 7.54 | 1482 |
| m | $MnO_2$ | 972 | — | 1528 |
| n | $Fe_2O_3$ | 841 | 7.74 | 1519 |
| o | CoO | 972 | 7.75 | 1496 |
| p | NiO | 979 | 7.39 | 1538 |
| q | CuO | 855 | 7.05 | 1496 |
| r | ZnO | 945 | 6.83 | 1548 |
| s | CaO | 896 | 9.5 | 1430 |
| t | $Ga_2O_3$ | 986 | 10.16 | — |
| u | $In_2O_3$ | 1015 | 9.92 | — |
| v | $HfO_2$ | 1005 | 9.85 | — |
| w | $Ta_2O_5$ | 1075 | 10.86 | — |
| x | $B_2O_3$ | 915 | 9.93 | — |

— means not measured

The data presented in Table IV demonstrate that a number of elemental derivatives, when used as whisker growth enhancing compounds, provide self-reinforced silicon nitride compounds with satisfactory physical properties. Similar results are expected with other compositions which are disclosed herein.

EXAMPLE 6(a-g)

Effect of Adding Aluminum Nitride or Boron Nitride

A series of hot-pressed silicon nitride ceramic compositions is prepared according to the procedure of Example 5 except, in the case of Examples 6a-6d, for a variation in the mixing technique due to a change in mixing medium from toluene to methanol and the substitution of a small amount (see Table Va) of aluminum nitride (Example 6a) or boron nitride (Example 6b) for silicon nitride in the compositions shown respectively for Examples 5c and 5j.

About 80 ml of methanol are added to the same attritor as used in Example 5 with stirring at a rate of 200 rpm. The powder components are added slowly over a period of about 18 minutes with additional methanol (about 50 ml) as needed to wash the powder components from the walls of the attritor. If desired for more uniform and rapid dispersion, a dispersant, such as a 50% mixture of polyethyleneimine in methanol, commercially available under the trade designation Corcat P-12 from Virginia Chemicals, may be added in an amount of, for example, 26 drops. After mixing for an hour at 220 rpm, a small amount (14 drops) of oleic acid is added to flocculate the slurry. The flocculated slurry is then recovered as described in Example 5.

Composition and physical property data for Examples 6a-6h as well as 5c and 5j are summarized in Tables Va-Vc.

TABLE Va

| Ex. No. | Additives (wt-%) | | | | Fracture Strength (MPa) | Fracture Toughness (MPa·m½) | Vickers Hardness (kg/m²) |
|---|---|---|---|---|---|---|---|
| | SrO | NbB₂ | AlN | BN | | | |
| 5c | 0.5 | 0.0 | 0.0 | 0.0 | 869 | 8.56 | 1604 |
| 6a | 0.5 | 0.0 | 1.0 | 0.0 | 1096 | 10.26 | 1541 |
| 5j | 0.0 | 0.5 | 0.0 | 0.0 | 1034 | 8.21 | 1512 |
| 6h | 0.0 | 0.5 | 0.0 | 1.0 | 1076 | 8.72 | 1482 |

TABLE Vb

| Ex. No. | Additives (wt-%) | | | Fracture Strength (MPa) | Fracture Toughness (MPa·m½) | Vickers Hardness (kg/m²) |
|---|---|---|---|---|---|---|
| | ZnO | AlN | BN | | | |
| 6c | 0.5 | 1.0 | 0.0 | 1014 | 8.44 | 1496 |
| 6d | 0.5 | 0.0 | 1.0 | 917 | 8.52 | 1537 |

TABLE Vc

| Ex. No. | BN (wt-%) | Fracture Strength (MPa) | Fracture Toughness (MPa·m½) | Vickers Hardness (kg/m²) |
|---|---|---|---|---|
| 5c | 0.0 | 869 | 8.56 | 1604 |
| 6e | 0.5 | 896 | 9.45 | 1450 |
| 6f | 2.0 | 931 | 9.39 | 1365 |
| 6g | 3.0 | 958 | 8.76 | 1377 |

A review of the data presented in Tables Va-Vc highlights several points. First, the substitution of a minor amount of aluminum nitride or boron nitride for a corresponding amount of silicon nitride provides improvements in both fracture strength and fracture toughness at the expense of a limited reduction in hardness (Table Va). Second, the trend shown in Table Va wherein AlN appears to provide a greater improvement in fracture strength and fracture toughness than BN does not hold true for all compositions. Table Vb shows that the reverse is true when the whisker growth enhancing compound is ZnO. Third, substantial increases in the amount of BN give limited improvement in fracture strength at the expense of both fracture toughness and hardness. In other words, large amounts of AlN or BN are unnecessary. In addition, a certain amount of physical property tailoring is possible with limited compositional variation. Similar results are attained with other compositions of the present invention.

EXAMPLES 7a-7e

Replication of Example 6b with Varying Amounts of the Glassy Phase

Using the procedure of Example 6, the components of Example 6b (Si₃N₄, Y₂O₃, MgO, NbB₂ and BN) and the component ratios of components other that silicon nitride, a series of four hot-pressed silicon nitride ceramic bodies are prepared with varying percentages of the Si₃N₄ phase (components other than silicon nitride). The component ratios are 1.8 (Y₂O₃/MgO), 14.7 (total glassy phase/BN) and 29.4 (total glassy phase/NbB₂). The Si₃N₄ content and physical properties are summarized in Table VI.

TABLE VI

| Ex. No. | Si₃N₄ (wt-%) | Fracture Strength (MPa) | Fracture Toughness (MPa·m½) | Vickers Hardness (kg/m²) |
|---|---|---|---|---|
| 7a | 80 | 993 | 9.17 | 1404 |
| 7b | 85 | 1076 | 8.72 | 1482 |
| 7c | 90 | 1069 | 9.92 | 1526 |
| 7d | 95 | 1096 | 9.47 | 1548 |
| 7e | 97 | 875 | 8.45 | 1601 |

The data presented in Table VI suggest that the Si₃N₄ content may be varied considerably without undue adverse effects upon physical properties of the resultant hot-pressed silicon nitride ceramic bodies. Similar results are attainable with other compositions of the present invention.

EXAMPLES 8a-8d

Replication of Example 6a with Varying Amounts of the Glassy Phase

Using the procedure of Example 6, the components of Example 6a (Si₃N₄, Y₂O₃, MgO, SrO and AlN) and the component ratios of components other that silicon nitride, a series of four hot-pressed silicon nitride ceramic bodies are prepared with varying percentages of the Si₃N₄ phase (components other than silicon nitride). The component ratios are 1.8 (Y₂O₃/MgO), 14.7 (total glassy phase/AlN) and 29.4 (total glassy phase/SrO). The Si₃N₄ content and physical properties are summarized in Table VII.

TABLE VII

| Ex. No. | Si₃N₄ (wt-%) | Fracture Strength (MPa) | Fracture Toughness (MPa·m½) | Vickers Hardness (kg/m²) |
|---|---|---|---|---|
| 8a | 85 | 1089 | 9.3 | 1591 |
| 8b | 90 | 1125 | 8.7 | 1622 |
| 8c | 95 | 1102 | 8.6 | 1632 |
| 8d | 97 | 993 | 8.8 | 1651 |

The data presented in Table VII suggest that the trend in physical property changes observed in Examples 7a-7e as a result of an increase in Si₃N₄ content holds true when AlN is substituted for BN and NbB₂ is replaced by SrO. Similar results are attainable with other compositions of the present invention.

COMPARATIVE EXAMPLES 3a-3e

Effect of Omitting One or More Components of the Composition of Example 5g

Using the procedure of Example 5, a series of hot-pressed silicon nitride ceramic bodies are prepared by omitting one or more components of the composition of Example 5g and adjusting the remaining components as shown in Table VIII. Table VIII also shows the resultant physical properties. Example 5g is included in Table VIII for ease of comparison.

TABLE VIII

| Ex/Comp Ex No. | Composition (wt-%) | | | | Fracture Strength (MPa) | Fracture Toughness (MPa·m½) | Vickers Hardness (kg/m²) |
|---|---|---|---|---|---|---|---|
| | Si₃N₄ | Y₂O₃ | MgO | CaO | | | |
| 5g | 86.3 | 8.5 | 4.7 | 0.5 | 896 | 9.5 | 1430 |
| 3a | 86.8 | 8.5 | 4.7 | 0.0 | 607 | 5.0 | 1480 |
| 3b | 86.3 | 0.0 | 13.2 | 0.5 | 386 | 5.57 | 1449 |
| 3c | 86.8 | 0.0 | 13.2 | 0.0 | 352 | 4.65 | 1450 |
| 3d | 86.3 | 13.2 | 0.0 | 0.5 | 510 | 3.83 | 1461 |

TABLE VIII-continued

| Ex Comp Ex No | Composition (wt-%) | | | | Fracture Strength (MPa) | Fracture Toughness (MPa·m½) | Vickers Hardness (kg/m²) |
|---|---|---|---|---|---|---|---|
| | Si₃N₄ | Y₂O₃ | MgO | CaO | | | |
| 3e | 86.8 | 13.2 | 0.0 | 0.0 | 572 | 5.54 | 1534 |

The data presented in Table VIII clearly demonstrate the effect of omitting one or more components, as in Comparative Examples 3a-3e, from the composition of Example 5g. Although the data contained in this table relates to the use of a calcium derivative as the additive component, similar results are attainable without undue experimentation using other derivatives of elements listed in The Periodic Table of the Elements and included within the scope of the present invention.

EXAMPLES 9(a-c)

Effect of Varying the Source of Niobium

Using the procedure of Example 6, a series of three hot-pressed silicon nitride ceramic bodies are prepared using sources of niobium other than that used in Example 5j. The sources of niobium are as follows:
Example 9a—Nb₃Sn
Example 9b—Nb₃Ga
Example 9c—NbO
Physical property data for the three bodies and for Example 5j are summarized in Table IX.

TABLE IX

| Example No. | Fracture Strength (MPa) | Fracture Toughness (MPa·m½) | Vickers Hardness (kg·m²) |
|---|---|---|---|
| 5j | 1034 | 8.21 | 1500 |
| 9a | 1000 | 8.03 | 1529 |
| 9b | 938 | 8.20 | 1538 |
| 9c | 896 | 7.26 | 1533 |

The data presented in Table IX demonstrate that non-oxide derivatives perform as well as, if not better, than the oxides. Similar results are attainable with other compositions of the present invention without undue experimentation.

EXAMPLES 10(a-b)

Effect of Replacing MgO with SrO or CaO

Using the procedure of Example 5, two hot-pressed silicon nitride ceramic bodies are prepared by substituting equal weight percentages of strontium oxide (SrO) (Example 10a) or calcium oxide (CaO) (Example 10b) for the magnesium oxide (MgO) used in Example 5. Physical property data for the two bodies and for Examples 5c and 5s are summarized in Table X. CaO is the whisker growth enhancing compound for Examples 10a and 5s. SrO is the whisker growth enhancing compound for Examples 10b and 5c.

TABLE X

| Example No | Fracture Strength (MPa) | Fracture Toughness (MPa·m½) | Vickers Hardness (kg/m²) |
|---|---|---|---|
| 10a | 1027 | 6.67 | 1634 |
| 5s | 896 | 9.5 | 430 |
| 10b | 1014 | 6.61 | 1556 |
| 5c | 869 | 8.56 | 1604 |

The data presented in Table X demonstrate that strontium oxide and calcium oxide are suitable substitutes for magnesium oxide. Similar results are expected with other oxides from Group IIA of the Periodic Table of the Elements, namely beryllium oxide, barium oxide and radium oxide.

EXAMPLE 11

Effect of Using Magnesium Oxide as a Whisker Growth Enhancing Compound.

Using the procedure of Example 10 and the composition of Example 10b, save for the substitution of 0.5 weight percent MgO for a like amount of SrO, a hot-pressed silicon nitride ceramic body is prepared. Physical property data for the body are as follows:
Fracture Strength (MPa)—800
Fracture Toughness (MPa·m½)—7.94
Vickers Hardness (kg/m²)—1545
The data demonstrate the suitability of MgO as a whisker growth enhancing compound.

EXAMPLE 12(a-b)

Effect of Substituting SrO for MgO in Compounds Containing a Small Amount of Aluminum Nitride.

Using the procedure of Example 6, two hot-pressed silicon nitride ceramic bodies are prepared from the compositions shown in Table XIA. Physical property data for the bodies are shown in Table XIB.

TABLE XI A

| Example No. | Si₃N₄ | Y₂O₃ | SrO | AlN | TiO₂ |
|---|---|---|---|---|---|
| 12a | 96 | 2.32 | 1.28 | 0.27 | 0.13 |
| 12b | 97 | 1.74 | 0.96 | 0.2 | 0.1 |

TABLE XI B

| Example No. | Fracture Strength (MPa) | Fracture Toughness (MPa·m½) | Vickers Hardness (kg/m²) |
|---|---|---|---|
| 12a | 820 | 8.52 | 1650 |
| 12b | 770 | 8.29 | 1640 |

The data shown in Table XIB, like that of Table IX, demonstrate the suitability of SrO as a substitute for MgO in the preparation of self-reinforced silicon nitride bodies. Similar results are expected with other oxides from Group IIA of the Periodic Table of the Elements.

Evaluation of Cutting Tool Effectiveness

The hot-pressed silicon nitride body of Example 12 is diamond ground according to American National Standards Institute (A.N.S.I.) standards into an SNG 434 style cutting tool insert. The cutting edge is chamfered at a 30° angle with a 0.006 inch (0.015 cm) width.

The insert is tested in a face milling application using a 40 Horsepower Cincinnati #5 single spindle, knee and saddle, vertical milling machine with a 5 Horsepower variable speed table. The work material is Class 30 grey cast iron, four inches (10.16 cm) wide and 12 inches (30.48 cm) long with a measured hardness of 170 BHN (220 kg/mm²). A milling cutter having a 12 inch (30.48 cm) diameter, one tooth milling cutter, is used with a −5° axial rake and a −5° radial rake. A 15° lead angle is employed. The machine is run at a cutting speed of 3000 surface feet per minute (914 meters per minute), a 0.060 inch (0.152 cm) depth of cut, and a feed rate of 0.013 inch (0.330 mm) per revolution (or tooth). The center line of the cutter and the center line of the workpiece are coincident. No cutting fluid is used.

Successive passes are taken on the cast iron work material. The cutting edge is examined for flank wear and chippage after each pass. Testing is terminated when the flank wear or the chippage exceeds 0.010 inch (0.025 cm) in depth as measured with a 30power microscope. The insert removes about 590 cubic inches (9668 cm³) of iron prior to failure. An SNG 434 style cutting tool insert prepared from a nominal silicon nitride material (actually a silicon-alumina-nitride or sialon) marketed by Kennametal Corporation under the trade designation Kyon TM 3000 removes 340 cubic inches (5572 cm³) of iron prior to failure. An SNG 434 style cutting tool insert prepared from a silicon nitride material marketed by Boride Products under the trade designation US-20 removes 311 cubic inches (5096 cm³) of iron prior to failure.

The foregoing illustration demonstrates the suitability of the self-reinforced silicon nitride material prepared in Example 12b in cutting tool applications. Similar results are expected with other compositions disclosed herein.

EXAMPLE 13

Substitution of Lanthanum Oxide for Yttrium Oxide

Using the procedure of Example 5, and a composition identical to that of Example 5s, save for the substitution of lanthanum oxide for yttrium oxide, a hot-pressed silicon nitride body is prepared. Physical property data for the body are as follows:
  Fracture Strength (MPa)—930
  Fracture Toughness (MPa·m½)—9.0
  Vickers Hardness (kg/m²)—1526

The data demonstrate the suitability of lanthanum oxide as a conversion aid. Similar results are expected with other oxides of elements from Group IIIA of the Periodic Table of the Elements. Satisfactory results are also expected with non-oxide sources of the Group IIIA elements as well as sources of Group IIA elements.

EXAMPLE 14(a-b)

Substitution of Sodium Oxide for Yttrium Oxide or Maganesium Oxide

Using the procedure of Example 5, and a composition identical to that of Example 5s, save for the substitution of sodium oxide for yttrium oxide in Example 14a and the substitution of sodium oxide for magnesium oxide in Example 14b, two hot-pressed silicon nitride bodies are prepared. Physical property data for the bodies are shown in Table XII.

TABLE XII

| Example No. | Frcture Strength (MPa) | Fracture Toughness (MPa · m½) |
|---|---|---|
| 14a | 925 | 8.54 |
| 14b | 720 | 7.4 |

The data presented In Table XII demonstrate that sodium oxide is an effective substitute either as a densification aid (Example 14b) or a conversion aid (Example 14a). Similar results are obtained by substituting zinc oxide (ZnO), hafnium oxide (HfO) and tantalum oxide (Ta₂O₅) for magnesium oxide. Similar results are expected with other sources of sodium as well as sources of other elements of Group IA of the Periodic Table of the Elements.

EXAMPLE 15(a-h)

Variation in the Ratio of Conversion Aid to Densification Aid

A series of hot-pressed silicon nitride ceramic compositions is prepared according to the procedure of Example 6, except that the ratio of conversion aid (yttrium oxide) to densification aid (magnesium oxide) is varied as shown in Table XIII. The basic composition of the powder mixture is 86.3 percent Si₃N₄, 0.5 percent CaO and 13.2 percent of a combination of MgO and Y₂O₃. The fracture toughness and the flexure strength are shown in Table XIII for each composition.

TABLE XIII*

| Ex. 15 | Y₂O₃/MgO | Fracture Toughness (MPa · m½) | Fracture Strength (MPa) |
|---|---|---|---|
| a | 8:1 | 7.15 | 827 |
| b | 5:1 | 10.02 | 944 |
| c | 3:1 | 9.53 | 1006 |
| d | 1.8:1 | 10.37 | 1034 |
| e | 1:1 | 10.50 | 1034 |
| f | 1:2 | 9.46 | 930 |
| g | 1:3 | 7.68 | 703 |
| h | 1:4 | 6.54 | 701 |

*Percentages of components are based on weight percent in the powder mixture.

The data presented in Table XIII demonstrate that a wide range of compositional variation produces hot-pressed silicon nitride ceramic bodies having a fracture toughness in excess of 6 MPa·m½ and a flexure strengths in excess of 700 MPa. Similar results are expected with other compositions disclosed herein.

EXAMPLE 16(a-f)

Effect of Hot-Pressing Temperature Upon Physical Properties

A series of hot-pressed silicon nitride ceramic compositions is prepared according to the procedure of Example 6, save for one modification. The modification is the maximum temperature of 1825° C. used in Example 1 is varied as shown in Table XIV. All compositions are identical to that of Example 15d. The Palmqvist Toughness of each composition is also shown in Table XIV.

TABLE XIV

| Example Number | Temperature (°C.) | Palmqvist Toughness (kg/mm) |
|---|---|---|
| 16a | 1650 | 36.9 ± 1.7 |
| 16b | 1700 | 40.1 ± 1.5 |
| 16c | 1750 | 42.4 ± 1.8 |
| 16d | 1785 | 44.4 ± 1.8 |
| 16e | 1825 | 44.9 ± 1.9 |
| 16f | 1850 | 43.2 ± 0.6 |

The data presented in Table XIV demonstrate that acceptable Palmqvist Toughness is attainable over a relatively broad temperature range. Similar results are expected with other physical properties such as fracture strength and fracture toughness as well as with other compositions disclosed herein.

EXAMPLE 17(a-c)

Effect of Hot-Pressing Time Upon Physical Properties

A series of hot-pressed silicon nitride ceramic compositions is prepared according to the procedure of Example 16e, save for one modification. The sole modification is a change in the hot-pressing time from minutes to that shown in Table XV. Accordingly, all hot-pressing is done at a temperature of 1825° C. The Palmqvist Toughness of the compositions is also shown in Table XV. The Palmqvist Toughness and hot-pressing time for Example 16e is shown for comparison.

TABLE XV

| Example Number | Time (minutes) | Palmqvist Toughness (kg/mm) |
|---|---|---|
| 16e | 60 | 44.9 ± 1.9 |
| 17a | 5 | 40.4 ± 1.2 |
| 17b | 15 | 41.3 ± 1.5 |
| 17c | 120 | 39.6 ± 1.7 |

The data presented in Table XV demonstrate that considerable latitude in terms of time produces acceptable Palmqvist Toughness values. Similar results are expected with other physical properties such as fracture strength and fracture toughness as well as with other compositions disclosed herein.

EXAMPLE 18(a-g)

Effect of Silica (SiO$_2$) Content Upon Physical Properties

A series of hot-pressed silicon nitride ceramic compositions is prepared using the procedure and composition of Example 1 with modifications of the silica (SiO2) content of the composition. Silica (SiO2) is inherently present in Si$_3$N$_4$. The actual SiO2 content of a particular powder depends upon variables such as particle size and method of preparation. Typical commercially available Si3N4 powder has an oxygen content in excess of two percent by weight of powder which equates to an SiO2 content of 3.75 percent by weight of powder or more. The Si3N4 powder used in this example is commercially available from UBE Industries America under the trade designation UBE-SN-10 and has an oxygen content of 1.3 percent by weight of powder which equates to a silica content of 2.43 percent by weight of powder. Free silica is added to increase the silica content and thereby the oxygen content of a given composition. The total silica content (weight percent), fracture strength and fracture toughness for each composition is shown in Table XVI.

TABLE XVI

| Ex. No. | Total SiO$_2$ (wt-%) | Fracture Strength (MPa) | Fracture Toughness (MPa · m$^{\frac{1}{2}}$) |
|---|---|---|---|
| 18a | 2.34 | 890 | 9.1 |
| 18b | 2.59 | 1048 | 9.6 |
| 18c | 2.84 | 1082 | 9.4 |
| 18d | 3.09 | 1254 | 9.7 |
| 18e | 3.59 | 1254 | 9.8 |
| 18f | 4.09 | 1034 | — |
| 18g | 5.09 | 1069 | — |

— means not measured

The data presented in Table XVI demonstrate that control of composition oxygen content, at least in the form of silica, has a marked effect upon fracture strength of resultant hot-pressed bodies. Similar results are expected with other compositions disclosed herein.

EXAMPLE 19

Evaluation of Chemical Compatibility of Potential Reinforcing Materials

Dense pieces of a number of different ceramic materials are polished and placed into the cavity of a graphite die similar to that of Example 1. The ceramic materials are titanium carbide, boron carbide, silicon carbide, aluminum oxide, zirconium oxide, magnesium oxide, aluminum nitride, titanium diboride and mullite. A powder mixture, prepared as in Example 1, is poured into the die cavity and hot-pressed as in Example 1 save for increasing the hot-pressing temperature to 1850° C. and the time at pressure to one hour. The powder mixture contains 90% silicon nitride, 5.8% yttria, 3.2% magnesia, 0.33% calcia and 0.67% silica.

The hot-pressed material is sectioned to provide interfaces between the silicon nitride composition and each of the previously densified ceramic materials. The interfaces are polished and examined by scanning electron microscopy (SEM) for the presence of elongated grains of β-silicon nitride. The SEM examination shows that elongated grains of β-silicon nitride are found at or near the interfaces of all previously densified ceramic materials save for aluminum nitride, magnesia and mullite. Based upon this preliminary examination, the latter three materials are believed to be unsuitable for use as reinforcing materials in preparing the silicon nitride ceramic bodies of the present invention. Similar results are attainable with other forms of the ceramic materials evaluated in this example.

EXAMPLE 20

Evaluation of Silicon Carbide Whiskers as a Reinforcing Material

The powder mixture of Example 19 is admixed with varying amounts of silicon carbide whiskers (American Matrix) and hot-pressed as in Example 19. The whiskers have a number average diameter of 0.9 micrometer and an average aspect ratio of about 11. The resultant hot-pressed bodies are tested for Vickers hardness and Palmqvist toughness as in Example 1. The amounts of silicon carbide whiskers and the test results are shown in Table XVII.

TABLE XVII

| Sample Number | Volume Percent SiC Whiskers | Vickers Hardness (kg/mm$^2$) | Palmqvist Toughness (kg/mm) |
|---|---|---|---|
| 20a | 10 | 1580 | 44.3 |
| 20b | 20 | 1587 | 37.2 |
| 20c | 25 | 1587 | 37.0 |
| 20d | 30 | 1595 | 36.1 |

The data presented in Table XVII show that SiC whisker loadings of 30 volume percent provide a Palmqvist Toughness which approaches the values of 30–36 kg/mm reported for hot-pressed silicon nitride having neither elongated silicon nitride grains nor reinforcing materials such as silicon carbide whiskers admixed therewith. All of the samples in Table XVII, when examined by SEM as in Example 19, show the presence of elongated silicon nitride grains. By way of contrast, hot-pressed bodies having SiC whisker loadings in excess of 30 volume percent contain no elongated silicon nitride grains. Similar results are obtained with other reinforcing materials and compositions all of which are disclosed herein.

EXAMPLE 21

Evaluation of Multiple Reinforcement at Various Temperatures

A powder mixture containing 98% silicon nitride, 0.74% yttria, 0.7% silica, 0.46% magnesia and 0.1% tantalum oxide is prepared as in Example 1. A portion of the powder mixture is mixed with an amount of the same silicon carbide whiskers as in Example 20 to provide an admixture containing 25 weight percent silicon carbide whiskers. Equal volumes of the powder mixture and the admixture are converted to hot-pressed silicon nitride bodies using the procedure of Example 20. The resultant bodies are subjected to Vickers Hardness (VH) (kg/mm$^2$) and Fracture Strength (FS) (MPa) testing as in Example 1. The bodies are also tested for Young's Modulus (YM) (GPa) in accordance with Military Standard 1942b at elevated temperatures. The test results are shown in Table XVIII.

TABLE XVIII

| Samples No. | SiC Whiskers | 20° C. VH | 20° C. FS | 1200° C. FS | 1200° C. YM | 1375° C. FS | 1375° C. YM |
|---|---|---|---|---|---|---|---|
| 21a | yes | 1810 | 730 | 475 | 278 | 285 | 71 |
| 21b | no | 1614 | 792 | 543 | 200 | 206 | 22 |

The data presented in Table XVIII demonstrate that the presence of a reinforcing material in addition to the elongated silicon nitride grains grown in situ provides improvements in high temperature strength, e.g., at 1375° C., and Young's Modulus, e.g., at temperatures of 1200° C. or above. The data also show that hardness at room temperature (20° C.) is improved by the addition of such a reinforcing material. Similar results are obtained with other reinforcing materials and compositions all of which are disclosed herein.

EXAMPLE 22

Evaluation of Platelets as Reinforcing Media

A powder mixture containing 71.69% silicon nitride, 4.6% yttria, 2.54% magnesia, 1.09% silica, 0.4% zirconia, and 19.68% silicon carbide platelets (C-Axis Corp.) is prepared as in Example 1 save for adding the platelets after the other components are well dispersed. Prior to adding the platelets, a portion of the mixture is removed from the mixing apparatus and recovered as in Example 1. Mixing is continued for the remainder of the mixture for a period of ten minutes to provide an admixture which is recovered as in Example 1. The platelets have an aspect ratio of 8-10 and an average diameter of 24μm. Equal volumes of the powder mixture and the admixture are converted to hot-pressed silicon nitride bodies using the procedure of Example 20. The resultant bodies are subjected to Vickers Hardness (VH) (kg/mm$^2$) and Palmqvist Toughness (kg/mm) testing. Test results are shown in Table XIX.

TABLE XIX

| Sample Number | SiC Platelets | Vickers Hardness (kg/mm$^2$) | Palmqvist Toughness (kg/mm) |
|---|---|---|---|
| 22a | yes | 1542 | 49.4 |
| 22b | no | 1525 | 45.1 |

The data presented in Table XIX show that platelets, like whiskers, provide satisfactory results when used as reinforcing media in conjunction with elongated silicon nitride grains found in silicon nitride bodies of the present invention. Similar results are obtained with other reinforcing materials and compositions all of which are disclosed herein.

EXAMPLE 23

Evaluation of Different Types and Amounts of SiC Reinforcing Media

Example 22 is replicated save for changes in the type of reinforcing media, the amount of reinforcing media or both. The reinforcing media are the platelets of Example 22, the whiskers of Example 21 or 0.25 μm average diameter silicon carbide whiskers (Tateho Chemical Industries Co., Ltd.). The resultant silicon nitride bodies are subjected to Palmqvist Toughness (kg/mm) testing. Test results are shown in Table XX together with the average diameter and weight percent of reinforcing media.

TABLE XX

| Sample No. | SiC Diameter (μm) | SiC Amount (%) | Palmqvist Toughness (kg/mm) |
|---|---|---|---|
| 23a | .25 | 10 | 37.4 |
| 23b | .25 | 20 | 35.7 |
| 23c | 0.9 | 20 | 37.2 |
| 23d | 0.9 | 30 | 36.1 |
| 23e | 24.0 | 20 | 49.4 |
| 23f | 24.0 | 40 | 37.3 |

The results shown in Table XX demonstrate that reinforcing media size plays an important part in determining the amount of reinforcing media which is suitable for a given composition. Similar results are obtained with other reinforcing materials and compositions all of which are disclosed herein.

What is claimed is:

1. A process for preparing a silicon nitride ceramic body having a fracture toughness greater than about 6 MPa (m)$^{\frac{1}{2}}$ and containing predominantly β-silicon nitride whiskers having a high average aspect ratio, the process comprising:

subjecting a powder mixture comprising
   (a) silicon nitride in an amount sufficient to provide a ceramic body;
   (b) a densification aid, said densification aid being a non-oxide derivative of magnesium or a source of an element selected from the group consisting of beryllium, calcium, strontium, barium, radium, lithium, sodium, potassium, rubidium, cesium, silicon, hafnium, tantalum, indium, galium, zinc, titanium and francium, said source being present in an amount sufficient to promote densification of the powder;
   (c) a conversion aid, said conversion aid being a non-oxide derivative of yttrium or a source of an element selected from the group consisting of scandium, actinium, lanthanum, lithium, sodium, potassium, rubidium, cesium and francium, said source being present in an amount sufficient to promote the essentially complete conversion of the starting silicon nitride to β-silicon nitride;
   (d) at least one whisker growth enhancing compound in an amount sufficient to promote the formation of β-silicon nitride whiskers, said compound being a non-oxide derivative of calcium, or a derivative of an element selected from the group consisting of sodium, potassium, scandium, titanium, vanadium, chromium, manganese, iron, cobalt, nickel, copper, zinc, strontium, zirconium, niobium, barium, lanthanum, and mixtures thereof, or an oxide of an element selected from the group consisting of gallium, indium, hafnium, tantalum and boron; and (e) a Palmqvist toughness enhancing amount of at least one preformed reinforcing material selected from the group consisting of β-silicon nitride in whisker or fiber form, and silicon carbide, titanium carbide, boron carbide, titanium diboride, aluminum oxide or zirconium oxide in whisker, fiber, particle or platelet form; (b), (c) and (d) being derived from three different elements;

to conditions of temperature and pressure sufficient to provide for densification and in situ formation of β-silicon nitride whiskers having an average aspect ratio of at least about 2.5 occur and such that the silicon nitride ceramic body having a fracture toughness greater than about 6 MPa (m)$^{\frac{1}{2}}$ is formed.

2. The process of claim 1 wherein the β-silicon nitride whiskers have an aspect ratio of between about 2 and about 16 and are present in an amount of at least about 20 volume percent, as measured by viewing one plane of the silicon nitride ceramic body by scanning electron microscopy.

3. The process of claim 1 wherein the starting silicon nitride contains no greater than about 10 weight percent β-silicon nitride.

4. The process of claim 1 wherein the densification aid is present in an amount within a range of from about 0.04 weight percent to about 27.0 weight percent based on the total weight of the powder mixture.

5. The process of claim 4 wherein the densification aid is selected from the group consisting of oxides of strontium, calcium and sodium.

6. The process of claim 1 wherein the conversion aid is present in an amount within a range of from about 0.2 weight percent to about 29.5 weight percent based on the total weight of the powder mixture.

7. The process of claim 1 wherein the densification aid and the conversion aid are present in amounts sufficient to provide a weight ratio of densification aid to conversion aid of from about 0.25 to about 8.

8. The process of claim 7 wherein the weight ratio is from about 1:1 to about 1.8:1.

9. The process of claim 1 wherein the whisker growth enhancing compound is present in an amount of from about 0.01 to about five weight percent based upon total weight of the powder mixture.

10. The process of claim 1 wherein the whisker growth enhancing compound is a non-oxide derivative of calcium.

11. The process of claim 1 wherein the whisker growth enhancing compound is an oxide of an element selected from the group consisting of gallium, indium, hafnium, tantalum and boron.

12. The process of claim 1 wherein the powder mixture further comprises silica in an amount of from about 2.3 to about 6 weight percent based upon total weight of the powder mixture.

13. The process of claim 1 wherein the powder mixture further comprises aluminum nitride or boron nitride in an amount of from about 0.01 to about 5 weight percent based upon total weight of the powder mixture.

14. The process of claim 1 wherein a total of the amount of silicon nitride plus the amount of preformed reinforcing material is in a range of from about 65 to about 99.75 weight percent based on the total weight of the powder mixture.

15. The process of claim 14 wherein the total amount is from about 80 to about 97 weight percent based upon total weight of the powder mixture.

16. The process of claim 1 wherein the temperature is in the range from about 1750° C. to about 1870° C.

17. The process of claim 1 wherein the pressure is in the range from about 3000 psig to about 6000 psig.

18. The process of claim 1 wherein the density of the silicon nitride ceramic is greater than about 95 percent of the theoretical value.

19. A process for preparing a silicon nitride ceramic body having a fracture toughness greater than about 6 MPa (m)$^{\frac{1}{2}}$ and containing predominantly β-silicon nitride whiskers having a high average aspect ratio, the process comprising:

subjecting a powder mixture comprising (a) silicon nitride in an amount sufficient to provide a ceramic body;

(b) a densification aid, said densification aid being a non-oxide derivative of magnesium or a source of an element selected from the group consisting of silicon, hafnium, tantalum, indium, galium, zinc and titanium, said source being present in an amount sufficient to promote densification of the powder;

(c) a conversion aid, said conversion aid being a non-oxide derivative of yttrium or a source of an element selected from the group consisting of scandium, actanium, lanthanum, lithium, sodium, potassium, rubidium, cesium and francium, said source being present in an amount sufficient to promote the essentially complete conversion of the starting silicon nitride to β-silicon nitride; and (d) at least one whisker growth enhancing compound in an amount sufficient to promote the formation of β-silicon nitride whiskers, said compound being a non-oxide derivative of calcium, or a derivative of an element selected from the group consisting of sodium, potassium, scandium, titanium, vanadium, chromium, manganese, iron, cobalt, nickel, copper, zinc, strontium, zirconium, niobium, barium, lanthanum, and mixtures thereof, or an oxide of an element selected from the group consisting of gallium, indium, hafnium, tantalum and boron; (b), (c) and (d) being derived from three different elements;

to conditions of temperature and pressure sufficient to provide for densification and in situ formation of β-silicon nitride whiskers having an average aspect ratio of at least about 2.5 occur and such that the silicon nitride ceramic body having a fracture toughness greater than about 6 MPa (m)$^{\frac{1}{2}}$ is formed.

20. A process for preparing a silicon nitride ceramic body having a fracture toughness greater than about 6 MPa (m)$^{\frac{1}{2}}$ and containing predominantly β-silicon nitride whiskers having a high average aspect ratio, the process comprising:

subjecting a powder mixture comprising (a) silicon nitride in an amount sufficient to provide a ceramic body;

(b) a densification aid, said densification aid being a non-oxide derivative of magnesium or a source of an element selected from the group consisting of beryllium, calcium, strontium, barium, radium, lithium, sodium, potassium, rubidium, cesium, silicon, hafnium, tantalum, indium, galium, zinc, titanium and francium, said source being present in an amount sufficient to promote densification of the powder;

(c) a conversion aid, said conversion aid being a non-oxide derivative of yttrium or a source of an element selected from the group consisting of scandium, actinium, lanthanum, lithium, sodium, potassium, rubidium, cesium and francium, said source being present in an amount sufficient to promote the essentially complete conversion of the starting silicon nitride to β-silicon nitride;

(d) at least one whisker growth enhancing compound in an amount sufficient to promote the formation of β-silicon nitride whiskers, said compound being a non-oxide derivative of calcium, or a derivative of an element selected from the group consisting of sodium, potassium, scandium, titanium, vanadium, chromium, manganese, iron, cobalt, nickel, copper, zinc, strontium, zirconium, niobium, barium, lanthanum, and mixtures thereof, or an oxide of an element selected from the group consisting of gallium, indium, hafnium, tantalum and boron; and (e) a Palmqvist toughness enhancing amount of at least one preferred, coated reinforcing material in whisker, fiber or platelet form, the reinforcing material selected from the group consisting of magnesium oxide, aluminum nitride and mullite, the coating selected from the group consisting of silicon carbide, titanium carbide, boron carbide, titanium diboride, aluminum oxide and zirconium oxide; (b), (c) and (d) being derived from three different elements;

to conditions of temperature and pressure sufficient to provide for densification and in situ formation of β-silicon nitride whiskers having an average aspect ratio of at least about 2.5 occur and such that the silicon nitride ceramic body having a fracture toughness greater than about 6 MPa $(m)^{\frac{1}{2}}$ is formed.

21. The process of claim 20 wherein a total of the amount of silicon nitride plus the amount of preformed, coated reinforcing material is in a range of from about 65 to about 99.75 weight percent based on the total weight of the powder mixture.

* * * * *